Patented June 16, 1953

2,642,376

UNITED STATES PATENT OFFICE 2,642,376

PROTECTED ENZYME PREPARATION

Rowland A. Gale, Yonkers, N. Y., and John Thomas Haigh, Minneapolis, Minn., assignors to Pillsbury Mills, Inc., Minneapolis, Minn., a corporation of Delaware No Drawing. Application August 12, 1949, Serial No. 110,037

1 Claim. (Cl. 195—63)

This invention relates to a novel method of treating aqueous suspensions of starch with starch converting enzyme preparations, and the invention also relates to an article of manufacture comprising a protected enzyme preparation which is useful in carrying out the improved method.

More especially, the invention is concerned with the preparation of starch adhesives by the enzymic conversion of starch to its degradation products, such as soluble starch, dextrin, and, in some cases, even simpler polysaccharides and monosaccharides.

Starch adhesives are used in many industries and are commonly prepared from starch by relatively unskilled operators in the plants or mills of the user of the adhesive. This is true, for example, in paper mills where partially solubilized starch is used in some cases for the surface sizing of paper, and in other cases for the coating of paper when the adhesive is combined with clay or other mineral matter. It is also common practice for certain mills in the textile industry to treat textile warp with partially solubilized starch to increase the strength of the warp during the weaving operation. In these and similar industrial applications, the converted starch product is referred to as "an adhesive," and the term "adhesive" is used herein in its broadest sense. It is well known, of course, that starch is also converted to dextrin which finds wide application as a bonding agent, and this is another example of the type of starch conversion with which this invention is concerned.

In converting starch to the desired extent, it is very important that this be done efficiently and without unnecessary waste because of the relatively high cost of the enzyme preparation and also because over-conversion or under-conversion necessitates reprocessing or blending.

Actual study of the conditions existing in numerous mills in the various industries referred to above revealed that large economic losses occurred as a result of (1) improper or inaccurate measuring of the quantity of enzyme preparation to be used; (2) deterioration in the potency of the enzyme preparation during storage, especially when subjected to high humidity or high temperature, which are conditions usually occurring in mills where enzyme preparations are used; and (3) detrimental influences which lower the potency of the enzyme preparation during the interval between the time when it is mixed with the starch-water system and the time when the gelatinization temperature is reached.

As will be understood by those skilled in the art, it is common practice to mix the raw starch with the desired proportion of water at approximately room temperature, and to immediately add an amount of enzyme preparation which has been calculated in the light of the stated potency of the particular enzyme preparation and the amount and nature of the starch to be converted. Thereupon the temperature of the system is raised, preferably with agitation, through the gelatinization temperature of the starch. Depending upon the optimum converting temperature of the particular enzyme preparation or, in other words, depending upon the temperature at which the particular enzyme preparation will convert the starch most efficiently, the temperature of the system, after gelatinization, may be raised or lowered.

We have found that during the time interval between the mixing of the enzyme preparation with water (either before or after the addition of starch) and the subsequent gelatinization of the starch the potency of the enzyme preparation is lowered by a number of deteriorating factors and this situation was heretofore beyond the control of the mill operator.

The potency may be adversely affected by such factors as the pH of the system, the amount of chlorine present in the water, or the presence of other substances which may exert a contaminating effect or which may, on the other hand, act to adsorb the enzyme. As will be apparent, these detrimental influences will be more or less effective, depending upon the time interval between the addition of the enzyme preparation and the gelatinization of the starch.

Our study of the conditions existing in the various mills of the several industries referred to above revealed that there is extreme lack of uniformity in the efficiency of the enzymic conversion of starch and that this is due to a very large degree to the tremendous variation in the time interval which elapses between the addition of the enzyme preparation and the time at which gelatinization of the starch occurs. In fact, this time interval may vary from a few minutes to twenty-four hours or more in different mills.

As is known, the potency of an enzyme preparation is stabilized by the presence of its substrate and consequently the deterioration in potency referred to above is not a problem after the starch has been gelatinized. Moreover, it is desirable that the enzyme preparation be released and dispersed throughout the starch-water system just prior to gelatinization so that there may be ample opportunity for interaction between the enzyme and the starch. The most important objective of this invention is to protect the enzyme preparation from deterioration during that period, which is often quite long, starting when the enzyme preparation is added to the slurry and ending at a time just prior to gelatinization of the starch.

Another object of the invention is to provide an enzyme preparation in the form of a preweighed or premeasured unit so as to eliminate errors which occur in the weighing or dispersing of enzyme preparations at the point of use. This is a particularly serious problem due to the wide variation in stated potencies of enzyme preparations now on the market.

Still other objects of the invention are to prevent loss of enzyme preparation due to the dusting which is apt to occur during weighing at the point of use; to save time and inconvenience of weighing; to eliminate danger of toxicological effects resulting from the handling of the product; and to improve the shelf life of the product by eliminating exposure of the product to air and moisture during storage.

We have found that enzymic conversion of starch may be carried out most effectively if the enzyme preparation is surrounded or enveloped by a material which will protect it from the detrimental influences or deteriorating factors referred to above during storage and during the critical period between the time that the enzyme preparation is added to the slurry and the time just prior to gelatinization of the starch.

Different types of starch gelatinize at different temperatures; for example, potato starch and tapioca starch gelatinize at approximately 140° F.–145° F., wheat starch at approximately 158° F.–160° F., and corn starch at approximately 168° F.–170° F. We prefer to provide a different product for converting each type of starch and the enzyme preparation is preferably released at a temperature about 10° F. below the temperature at which the particular starch will gelatinize. For example, if we are concerned primarily with corn starch we will surround the enzyme preparation with a material which will under normal operating conditions insure that no substantial part of the enzyme preparation will be contacted by the aqueous starch suspension until the temperature reaches approximately 160° F.

While best results may be achieved by providing a different enzyme product for each type of starch, there are obvious commercial advantages in supplying the consumer with a single enzyme product for use with any of the various starches commercially available. Accordingly, as another embodiment of this invention, we have developed a protective enzyme preparation which assures that exposure of the enzyme to the destructive influences mentioned above will be avoided until a period shortly before gelatinization of any of the common starches and which causes the release of the enzyme preparation in active form when the temperature of the starch slurry reaches approximately 130° F.

Preferably, we enclose the enzyme preparation in a sealed capsule or envelope which disintegrates or goes into solution, or at least opens up, at a predetermined temperature, as for example, 130° F. According to one embodiment of the invention, the enzyme preparation is protected not only by the capsule or enveloping film, but is protected more especially and even more effectively by being mixed with oil prior to encapsulation.

More specifically, but without limiting the invention to this particular embodiment, we have found that enzyme preparations may be mixed with an oil together with a dispersing agent which is harmless to the enzyme and by the proper choice of dispersing agent and proper proportioning thereof, the enzyme will be caused to separate from the oil and will be dispersed in the starch-water system at a predetermined temperature.

Preferably, the enzyme preparation, oil, and dispersing agent are encapsulated or enveloped in a material soluble in warm water such as gelatin, methyl cellulose or polyvinyl alcohol film, and the capsule or envelope may be heat-sealed.

By using the combination of a capsule or envelope together with an oily vehicle for the enzyme preparation, we provide double protection against the deteriorating factors mentioned above. The temperature at which the enzyme preparation is released will, in this case, depend on two factors (1) the temperature at which the capsule or envelope opens up and (2) the temperature at which the enzyme preparation is released from the oil and dispersed in the starch-water system.

For example, we may use a gelatin capsule which is partially preformed prior to being filled with the liquid vehicle containing the enzyme material and which is later fully formed or closed. Such a capsule will partially dissolve, or at least open up, at a temperature of approximately 130° F. and they may be made economically on a commercial scale from medium-hard gelatin with a wall thickness of .030–.040 inch. In this particular type of capsule we have successfully used approximately 36% starch liquefying enzyme concentrate, approximately 55% light liquid petrolatum, slightly more than 8% of a dispersing agent consisting of fatty esters of hexitol anhydrides having polyoxyethylene groupings, and somewhat less than 1% lecithin. Using the stated dispersing agents in the stated proportions, excellent dispersion of the enzyme preparation in the starch slurry took place at approximately 130° F. A lower proportion of dispersing agents would have resulted in dispersion at a higher temperature, and with a higher proportion of dispersing agents, the limiting factor would have been the temperature at which the capsule opened up.

It should again be emphasized that this invention contemplates the selection of encapsulating or enveloping materials which will disintegrate at lower temperatures, for example 100° F., provided that the combination of oil and dispersing agents is such that the enzyme will nevertheless be protected against contact with water until the temperature reaches the desired point, preferably about 10° below the gelatinization point of the starch. Again, in the case of a product designed especially for the use of corn starch you may use a capsule which will open up at approximately 130° F. and at the same time use a dispersing agent which will cause the enzyme preparation to become available throughout the aqueous starch solution at approximately 160° F. On the other hand, a careful selection and proportioning of the dispersing agent is not necessary if the capsule itself is designed to disintegrate, dissolve, or open up at a temperature about 10° lower than the gelatinization point of the starch.

The term "dispersing agents" as used above includes various wetting agents which do not adversely affect the potency of the enzyme preparation such as the fatty esters of hexitol anhydrides with or without the addition of polyoxyethylene chains to the non-esterified hydroxyls of the hexitol and it also includes such substances as lecithin and various aliphatic polyhydroxy substances partially esterified with higher molecular weight aliphatic or fatty acids.

As oily vehicles for the enzyme preparation we have successfully used petrolatum of high, low and medium viscosities, sesame oil, deodorized and refined kerosene, corn oil, pine oil, and soya oil, but obviously many other oils could be employed.

We have successfully varied the proportions of oil, enzyme concentrate, and dispersing agent but the proportion of oil must be sufficient to completely surround the enzyme preparation and preferably the proportion of oil is high enough to provide sufficient fluidity to enable economic encapsulation. The proportion of dispersing agent is chosen, as indicated above, to obtain good dispersion at the desired temperature.

We have also obtained satisfactory results by placing the enzyme preparation in an envelope made of polyvinyl alcohol film which was closed by heat-sealing the envelope without subjecting the powdered enzyme to temperatures above 150° F. The enzyme preparation was then protected solely by the polyvinyl alcohol film, no oily vehicle having been used and no dispersing agent being required.

The importance of protecting and then releasing enzymes of the starch liquefying type has been stressed above, but any other enzyme preparation may be protected and released in like manner.

It will, of course, be understood that other changes may be made in the processes, compositions, and structures referred to above without departing from the scope of the invention which generally stated consists in the matter shown and described in the appended claim.

What we claim is:

An article of manufacture which comprises an amylolytic enzyme preparation adapted for use in the enzymic conversion of starch and water suspensions, said preparation being carried in an oily vehicle selected from the group consisting of sesame oil, deodorized and refined kerosene, coal oil, pine oil and soya oil to protect the enzyme preparation from contact with the water suspension at a temperature of approximately 10 degrees below the gelatinization temperature of the starch, said oily vehicle containing fatty esters of hexitol anhydrides having polyoxyethylene groupings and lecithin as a dispersing agent which is capable of dispersing the enzyme preparation at said predetermined temperature, said preparation and oily vehicle being enveloped by a film of material selected from the class consisting of gelatin, cellulose, and polyvinyl alcohol, said film being water soluble at a temperature approximately 10° below the gelatinization temperature of the starch and substantially below the temperature at which the dispersing agent is capable of releasing the enzyme preparation from the oily vehicle.

ROWLAND A. GALE.
JOHN THOMAS HAIGH.

References Cited in the file of this patent

UNITED STATES PATENTS

| Number | Name | Date |
| --- | --- | --- |
| 427,553 | Cameron | May 13, 1890 |
| 1,444,250 | Kern | Feb. 6, 1923 |
| 2,029,970 | Wallerstein et al. | Feb. 4, 1936 |
| 2,547,429 | Wallerstein et al. | Apr. 3, 1951 |

FOREIGN PATENTS

| Number | Country | Date |
| --- | --- | --- |
| 543,245 | France | Nov. 7, 1921 |